Figure 1:
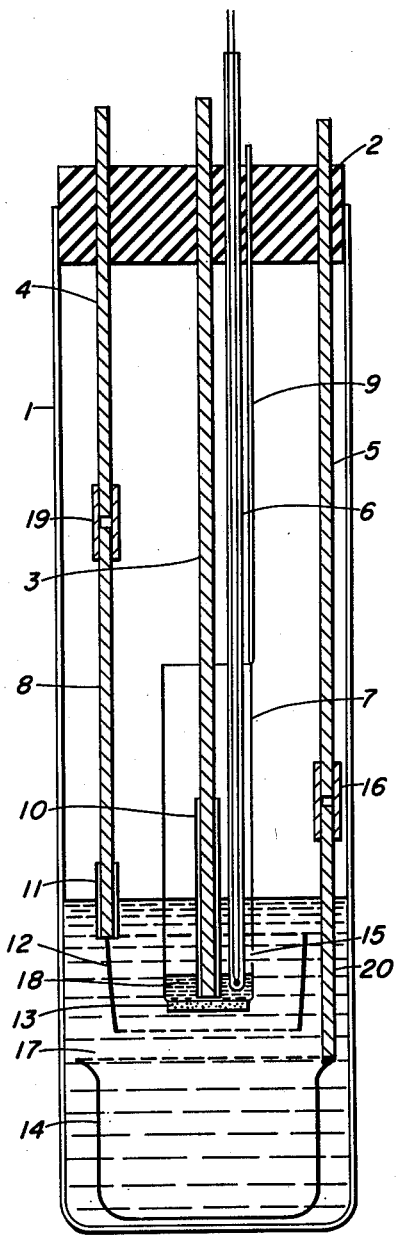

Feb. 2, 1960     C. W. BJORKLUND ET AL     2,923,670
METHOD AND MEANS FOR ELECTROLYTIC PURIFICATION OF PLUTONIUM
Filed April 4, 1958     3 Sheets-Sheet 1

WITNESSES:
Roy N. Smith, Jr.
Henry Heyman

INVENTOR.
Carl W. Bjorklund, Robert Benz
William J. Maraman, Joseph A. Leary, Kenneth A. Walsh
BY
Roland A. Anderson
Attorney PuCl₃-NaCl SYSTEM PuCl₃—KCl SYSTEM 2,923,670
Patented Feb. 2, 1960

2,923,670
METHOD AND MEANS FOR ELECTROLYTIC PURIFICATION OF PLUTONIUM

Carl W. Bjorklund, Robert Benz, William J. Maraman, and Joseph A. Leary, Los Alamos, N. Mex., and Kenneth A. Walsh, Lakeland, Fla., assignors to the United States of America as represented by the United States Atomic Energy Commission Application April 4, 1958, Serial No. 726,594

4 Claims. (Cl. 204—1.5)

The present invention relates to methods for electrodepositing plutonium and methods for electrodepositing plutonium and simultaneously forming plutonium base alloys, and more particularly to such methods of electrodepositing plutonium from non-aqueous electrolytes at low temperatures, and the electrolytes through which such depositions can be obtained.

While the methods and electrolytes of the present invention may be used simply for electrowinning pure plutonium metal from fused salt baths containing the salts of purse plutonium, they are more usefully applied in electrowinning relatively purse plutonium metal from such fused salt baths in which the plutonium is contaminated with some of the fission products resulting from the prior use of such plutonium as the fuel in a nuclear reactor. They are even more usefully applied when the anode in such methods consists of plutonium or a plutonium alloy fuel rod contaminated with such fission products by prior use as a nuclear reactor fuel and the process is electrorefining as d stinguished from electrowinning, and is most usefully applied when the cathode on which the plutonium is deposited reacts with the deposit to form an alloy of essentially the composition present prior to depletion of the plutonium by fission. By the latter techn:que it is possible to use the methods of the present invention in a continuous process for decontaminating plutonium alloy reactor fuels.

It is recognized that workers in the prior art have discovered certain electrolytes and conditions under which plutonium metal may be electrodeposited from a fused salt solution containing a plutonium salt. See, for instance, the co-pending application of Kolodney, SN–23,863, now U.S. Patent 2,893,928. Kolodney teaches a method for electrowinning plutonium metal from a fused salt solution consisting of a purse halide of plutonium and a mixture of alkali metal halides and alkaline earth halides. Kolodney's operating temperature is a minimum of 600° C., and he teaches that a lower temperature will permit co-deposition of the other metallic cations from the electrolyte, thereby contaminating the deposited plutonium. At this minimum operating temperature, the plutonium obtained by Kolodney was laid down in the form of a powder. To obtain massive plutonium, Kolodney found it necessary to raise his operating temperature to about 800° C.

It is desirable for many reasons to keep the operating temperature of the bath as low as possible. The higher the temperature, the more easily is a plutonium halide converted to an oxide, from which it is much more difficult to electrodeposit plutonium. The prevention of such conversion at high temperatures requires the use of an oxygen-free blanket of a non-reactive gas or a nearly perfect vacuum, whereas at lower temperatures a less pure inert gas or a more modest vacuum may be used. Lower temperatures also mean less vaporization of the molten salts, less corrosive reaction between bath and container, and greater ability to easily control the operating temperature.

It is, therefore, an object of the present invention to provide a method and means for electrodepositing plutonium from a fused halide salt bath containing a plutonium halide at a temperature less than 600° C.

It is another object to provide such a method and means for electrodepositing plutonium and for simultaneously forming an alloy of such plutonium with the cathode material.

A further object is a method and means for electrorefining plutonium from an anodic material consisting of plutonium or a plutonium alloy and the fission products of plutonium.

Another and further object is a method and means for simultaneously electrorefining plutonium from an anodic material of plutonium or an alloy of plutonium and simultaneously forming an alloy between the deposited plutonium and the cathode material.

An additional object is such a method and means for simultaneously electrorefining plutonium and forming an alloy with the cathode material in which the alloy thus formed is of substant:ally the same composition as the anode prior to the depletion of the plutonium by its use as a nuclear reactor fuel.

The above objects are accompl:shed by electrolyzing a low temperature bath of a plutonium trihalide and the corresponding halides of the alkali metals. In the preferred embodiment, the chlorides are used and the salts other than $PuCl_3$ are selected from LiCl, NaCl, and KCl. A composition is selected which has a low melting point. In the electrorefining process wherein an alloy is to be formed with the cathode mater:al, it has been found that certain alloys of plutonium which are useful as fuels in nuclear reactors will be formed in a molten state at temperatures considerably lower than the melting point of pure plutonium. By operating at such a temperature and by selecting a bath composition which is molten at such a temperature, the alloy is formed in the mass:ve state, eliminating the many problems which accompany deposition as a powder or dendrite.

To aid those skilled in the art to understand the present invention, an example is furnished below as an illustration of the present invent on. Also furnished in Figure 1 of the drawings is a cross section of the electrorefining cell of the present invention.

Referring now to the Figure 1, a Pyrex glass tube 1 contains a molten electrolyte 17, a non-aqueous mixture of halide salts including a plutonium halide. When these salts have been melted to form a fused salt solution by a surrounding electr:c resistance heater (not shown), a rubber stopper 2 which supports the electrodes and other structure is inserted in sealing relationship in the top of the tube. Supported therefrom are a tungsten anode lead 3, a tungsten cathode lead 4, a tungsten cup support rod 5, a Pyrex glass thermowell 6, and an anode cup support rod 9, also of Pyrex glass. Not shown are a pair of openings through the rubber stopper 2 for exhausting the space above the electrolyte and for supplying to such space a non-reactive gas, which may be flowing. Supported from anode cup support rod 9 is the Pyrex glass anode cup 7. This cup is necked down at its lower extremity to engage and hold plug 13, a medium grade sintered Pyrex glass disc. Anode cup 7 contains the plutonium or plutonium alloy anode 18, contaminated with fission products and typically molten at the operating temperature of the process. It also contains the opening 15 to allow access of the electrolyte 17 to the anode 18.

Supported from tungsten rod 8, an extension of cathode lead 4 through connector 19, is an iron cathode 12. This cathode is in the form of a hollow cylinder and is disposed above tantalum cup 14 so that molten material dripping from cathode 12 will be caught up in cup 14. The tungsten rod 8 is fitted at its lower end with a Pyrex glass sleeve 11 to prevent the tungsten from acting as an electrode. A Pyrex glass sleeve 10 is also fitted to the anode lead 3 for the same reason.

The tantalum cup 14 is supported from tantalum rod 20, which is an extension of cup support rod 5 through connector sleeve 16.

In operation the cathode 12 is immersed in the electrolyte 17 and the anode lead 3 is immersed in the molten anode 18. The sintered disc 13 permits ion transport through its pores but prevents the passage of liquid anode particles. Direct contact between anode and electrolyte is made possible through opening 15 in anode cup 7.

Although it is possible to use other materials as substitutes for the many Pyrex glass parts in the above-described cell, e.g., quartz glass, graphite, ceramics, tantalum or other suitable metals, the present invention obviates the need for such expensive materials. This, follows because the operating temperature in the process of the present invention never exceeds 600° C. and hence is well below the softening point of Pyrex glass.

It has been found that, in practicing the process of the present invention, there is none of the contaminating co-deposition of the other electrolyte cations at operating temperature less than 600° C., as taught by Kolodney. There is a slight amount of lithium deposited on the cathode, but even this slight amount is well segregated, forming solid dendrites suspended from areas of the cathode where no plutonium is deposited. In the overall process for forming liquid plutonium alloys by interaction with the cathode material, even this small amount of lithium is left behind, as it does not become a constituent of the alloy.

The above-mentioned process in which the deposited plutonium simultaneously alloys with the cathode material has two outstanding advantages. As mentioned above, it is a highly desirable step in establishing a continuous decontamination process, i.e., a process for removing the fission products from a partially depleted Pu-Fe fuel and restoring the original composition and mass prior to depletion by irradiation in a nuclear reactor. Since the alloy obtained in the present process must be enriched by a plutonium addition to replace that lost by fission and by processing losses, the iron fraction in the present alloy is deliberately made higher than that in the reconstituted fuel. While it would be possible to obtain a lesser fraction than that desired for such new fuel, the plutonium replacement would further decrease the iron fraction, making an iron addition mandatory. This would add an unnecessary step to the process, a step more difficult than the plutonium addition because the melting point of iron is considerably higher than that of plutonium. By properly adjusting the operating conditions in accordance with the present invention, the iron fraction in the alloy of the present process can be adjusted to approximately that required to restore the original fuel rod concentration with no appreciable excess of reconstituted fuel.

The second advantage alluded to above is that many plutonium alloys have melting points considerably lower than pure plutonium. For the plutonium-iron system, there is a eutectic in the 2–3 w/o (weight percent) Fe range that melts at about 410–430° C., as may be seen in the Pu—Fe equilibrium diagram on p. 406 of vol. 5—Metallurgy and Fuels, Progress in Nuclear Energy, ed. Finniston and Howe (McGraw-Hill: New York, 1956). By operating at temperatures up to 100–150° C. above this eutectic temperature with an iron cathode, a molten alloy is formed by reaction between the iron and the solid plutonium originally deposited. This molten alloy eventually drips from the cathode and is collected in a molten pool in a container below the cathode as massive plutonium alloy, thereby avoiding the many problems associated with solid plutonium in the form of a powder or as dendrites. By proper selection of the operating temperature, the average composition of the alloy deposited may be broadly controlled up to the melting point of pure plutonium (about 630° C.). The composition obtained is apparently that of the rightwardly-diverging iron-rich liquidus line from the above-mentioned eutectic point of the equilibrium diagram.

Figure 2:
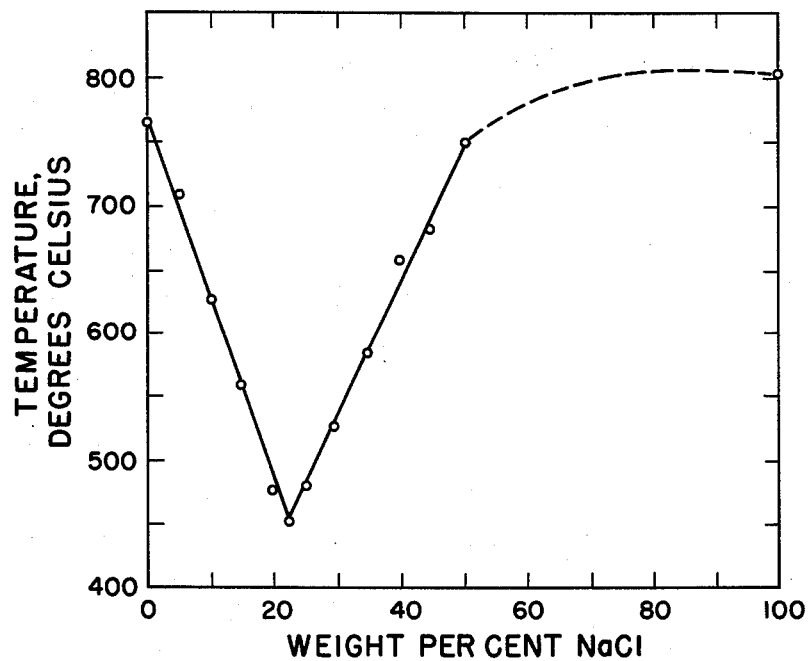
Figure 3:
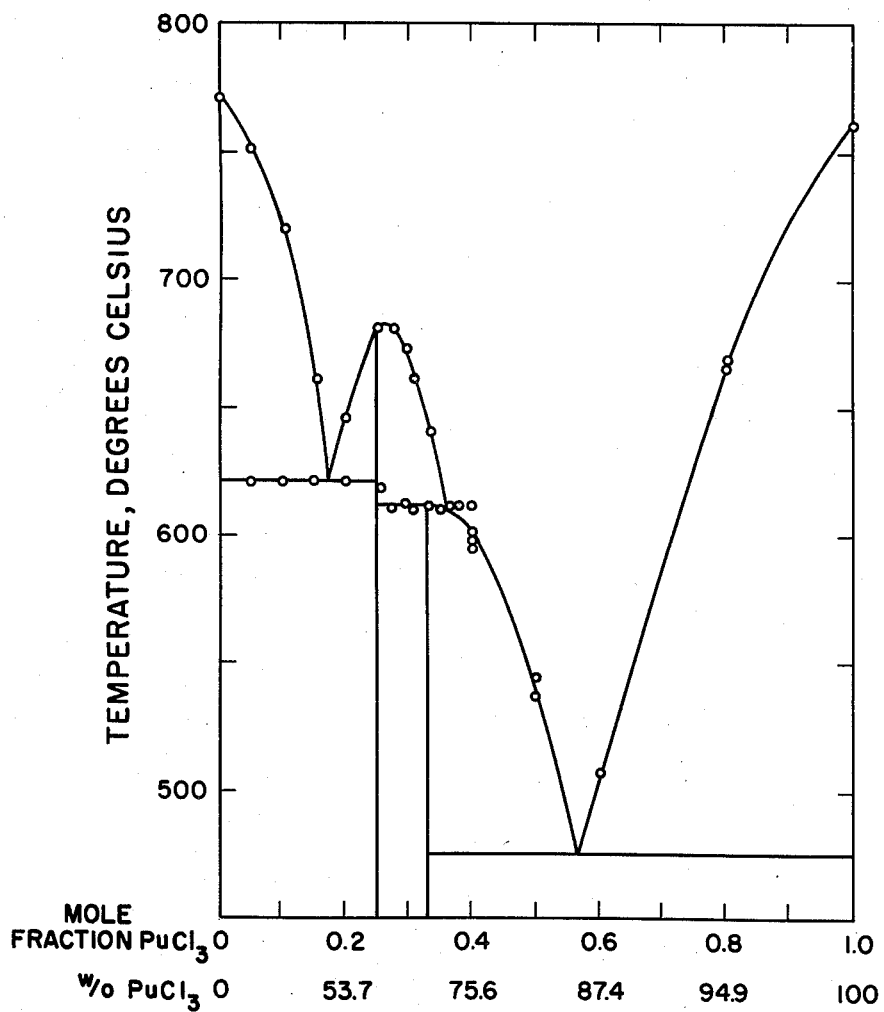

While the process and electrolytes of the present invention are illustrated only with an electrolyte of $LiCl$—$KCl$—$PuCl_3$, any electrolyte which includes $PuCl_3$ and one or more of the alkali metal chlorides LiCl, NaCl and KCl will also produce good results. The $NaCl$—$PuCl_3$ system shown in Figure 2 has a considerable liquid range below 600° C., extending from about 10 to 35 w/o NaCl with a eutectic of 22.3 w/o NaCl at 455° C. The $KCl$—$PuCl_3$ system shown in Figure 3 also has a considerable liquid range below 600° C., extending over the $PuCl_3$ mole fraction range of from about 0.40 to 0.72, or 7.8 to 24.4 w/o KCl, with a eutectic of 13.6 w/o KCl at about 475° C. While phase diagrams for the other binary and ternary systems have not been worked out in detail, various data points for such systems have been obtained. Electrolytes of $LiCl$—$PuCl_3$ containing 32, 78, and 92 w/o $PuCl_3$ have been found to be completely molten above 580° C. Baths of $NaCl$—$KCl$—$PuCl_3$ containing 48 w/o $PuCl_3$—29 w/o KCl—23 w/o NaCl to 62 w/o $PuCl_3$—8 w/o KCl—30 w/o NaCl have been found to be molten at temperatures from 490° C. to 550° C. A short electrolysis run at 520° C. and about 1 ampere current with such a bath containing 52 w/o $PuCl_3$, a solid plutonium anode and an iron cathode resulted in the production of a molten alloy on the cathode.

The following example is submitted as illustrative of the processes and electrolytes of the present invention. Where the expression "alloy" is used in the example and throughout this specification and in the appended claims, it is intended to signify not only intermetallic solutions, but also intermetallic compounds, e.g., $Pu_6Fe$, and mixtures of such intermetallic compounds and intermetallic solutions.

EXAMPLE

A bath having a total mass of 344 grams was prepared from a mixture of an LiCl—KCl eutectic and $PuCl_3$, the latter constituting 7.4 w/o of the bath. The plutonium content of the bath was thus 5.15 w/o, or 17.7 grams. This mixture was placed in a Pyrex electrolysis cell and heated to the operating temperature of 550° C. in a resistance furnace. The cell was vacuumed and argon gas at a pressure of about 46 cm. was admitted above the molten salts during heating and thereafter.

A tantalum cup was lowered into the bath, coming to rest in the bottom of the cell. A semi-cylindrical iron shell cathode was lowered into the bath, followed by an anode structure disposed at about the center of the iron shell. This anode was in the form of a small Pyrex glass tube containing plutonium "fissium" alloy which was liquid at the operating temperature of the cell. (A fissium alloy is a synthesized alloy designed to include with the basic fissionable element and any elements added thereto for dilution, mechanical strength, etc., representative concentrations of the most common elements formed by fission in the use of such alloy as a reactor fuel. The exact composition of the liquid fission alloy used herein is indicated in the table below.) The bottom of the tube was open and contained a medium grade sintered porous plug or frit of Pyrex glass. The iron cathode weighed 6.8 grams and the liquid anode weighed 19.73 grams (exclusive of tube and plug), containing 18.20 grams of plutonium.

A constant E.M.F. of 1.0 volt was applied between the electrodes from an external source. During this period the average current was 0.25 ampere D.C., with a maximum fluctuation of from 0.05 to 0.10 ampere. A beady deposit accumulated on the cathode, periodically dripping into the tantalum cup. The run was halted after 17 hours to analyze the materials. At that time the process was still proceeding smoothly with the same average current and with the same deposit forming on and dripping from the cathode.

At the end of the run, the weight of the residual liquid anode had decreased to 6.56 grams. It was analyzed to yield the results indicated below. A liquid deposit in the tantalum cup was allowed to cool to a button after withdrawing the cup and its weight was determined as 5.9 grams. The molten material clinging to the cathode was also allowed to cool and could not be mechanically separated from the cathode. The button and a part of the cathode were chemically and radiographically analyzed to yield the results below. The plutonium in the cathode was found to be 1.5 grams. There were no significant differences between the compositions of the button and the material removed from the cathode. There was no significant change in the mass or composition of the electrolyte.

*Composition by weight*

| Constituent | Liquid Fissium Alloy of Anode at Start | Residual Anode | Button |
|---|---|---|---|
| Pu | 92.3 w/o | 81.0 w/o | 96.5 w/o±1%. |
| Fe | 2.37 w/o | 7.29 w/o | 4.56 w/o±1%. |
| Ce | 0.735 w/o | <1,000 p.p.m. | <100 p.p.m. |
| Ru | 0.968 w/o | 3.19 w/o | <500 p.p.m. |
| Zr | 0.672 w/o | 2.08 w/o | <0.01 w/o. |
| La | 1.59 w/o | 0.35 w/o | <0.097 w/o. |
| Mo | 0.751 w/o | 2.2 w/o | 0.009 w/o. |
| Nb | 0.039 w/o | 0.21 w/o | 0.007 w/o. |
| Li | None | None | <0.06 w/o. |

The computed cathode current efficiency was a minimum of 60%, based on the plutonium recovered in the button and in the portion of the cathode analyzed.

Experimental work with various compositions of the same bath materials, using the 45 w/o LiCl—55 w/o KCl eutectic as a starting point and adding $PuCl_3$ in the range 0–43 w/o of the total bath indicates liquid solutions over the entire range at a temperature of 365° C. Electro-refining runs at 12 w/o, 31 w/o and 33 w/o $PuCl_3$ at temperatures of 470° C., 450° C. and 400° C., yielded results comparable to those in the example.

What is claimed is:

1. The process which comprises electrodepositing plutonium on an iron cathode from a fused salt solution consisting essentially of plutonium trichloride and at least one but not more than two chlorides selected from the class consisting of lithium chloride, sodium chloride and potassium chloride at a temperature not exceeding 600° C., the composition of said salt solution being selected from that range in which it exists as an entirely liquid phase at temperatures less than 600° C., in accordance with its equilibrium diagram.

2. The process of claim 1 in which the anode for said process of electrodepositing plutonium is predominantly plutonium.

3. The process of claim 1 in which the anode for said process of electrodepositing plutonium is predominantly plutonium and said salt solution consists essentially of 7–43 weight percent $PuCl_3$, balance an essentially eutectic mixture of KCl and LiCl.

4. The process of claim 1 in which the anode for said process is a depleted plutonium-iron fuel rod containing about 2–3 weight percent iron, and said salt solution consists essentially of 7–43 weight percent $PuCl_3$, balance an essentially eutectic mixture of KCl and LiCl.

References Cited in the file of this patent

UNITED STATES PATENTS

| 2,739,111 | Noland et al. | Mar. 20, 1956 |
| 2,743,228 | Boyer | Apr. 24, 1956 |
| 2,893,928 | Kolodney | July 7, 1959 |